US010488579B2

(12) United States Patent
Goeoetz et al.

(10) Patent No.: US 10,488,579 B2
(45) Date of Patent: Nov. 26, 2019

(54) OPTOELECTRONIC ARRANGEMENT HAVING A SEMICONDUCTOR CHIP AND A CONVERSION ELEMENT

(71) Applicant: OSRAM Opto Semiconductors GmbH, Regensburg (DE)

(72) Inventors: Britta Goeoetz, Regensburg (DE); Norwin von Malm, Nittendorf (DE); Dominik Schulten, Kelheim (DE)

(73) Assignee: OSRAM OPTO SEMICONDUCTORS GMBH, Regensburg (DE)

( * ) Notice: Subject to any disclaimer, the term of this patent is extended or adjusted under 35 U.S.C. 154(b) by 215 days.

(21) Appl. No.: 15/501,119

(22) PCT Filed: Aug. 25, 2015

(86) PCT No.: PCT/EP2015/069447
§ 371 (c)(1),
(2) Date: Feb. 1, 2017

(87) PCT Pub. No.: WO2016/030374
PCT Pub. Date: Mar. 3, 2016

(65) Prior Publication Data
US 2017/0219763 A1    Aug. 3, 2017

(30) Foreign Application Priority Data

Aug. 28, 2014  (DE) .................. 10 2014 112 395
Nov. 26, 2014  (DE) .................. 10 2014 117 312

(51) Int. Cl.
  *F21V 8/00*  (2006.01)
  *G02F 1/1335*  (2006.01)

(52) U.S. Cl.
  CPC ....... *G02B 6/0073* (2013.01); *G02F 1/13362* (2013.01); *G02F 1/133603* (2013.01);
  (Continued)

(58) Field of Classification Search
  CPC ............ G02B 6/0073; G02F 1/133603; G02F 1/13362; G02F 2001/133614; G02F 2202/36
  (Continued)

(56) References Cited

U.S. PATENT DOCUMENTS

2009/0109435 A1   4/2009   Kahen et al.
2011/0090711 A1   4/2011   Kim
(Continued)

FOREIGN PATENT DOCUMENTS

DE  202010017509 U1   2/2012
DE  102014108362 A1   12/2015
(Continued)

OTHER PUBLICATIONS

Banin, U. et al., "Hybrid Semiconductor-Metal Nanoparticles: From Architecture to Function," Chemistry of Materials, 2014, 14 pages.
(Continued)

*Primary Examiner* — Anh T Mai
*Assistant Examiner* — Hana S Featherly
(74) *Attorney, Agent, or Firm* — Slater Matsil, LLP (57) ABSTRACT

An optoelectronic arrangement and a lighting device are disclosed. In an embodiment the arrangement includes a semiconductor chip for generating radiation and a radiation conversion element located downstream of the semiconductor chip with respect to a radiation direction, wherein the radiation conversion element includes a plurality of conversion bodies each with a longitudinal extension axis, and wherein a spatial orientation of the longitudinal extension axes has a preferred direction.

20 Claims, 4 Drawing Sheets

(52) U.S. Cl.
CPC ............ *G02F 2001/133614* (2013.01); *G02F 2202/36* (2013.01)

(58) Field of Classification Search
USPC ........................................................ 362/612
See application file for complete search history.

(56) References Cited

U.S. PATENT DOCUMENTS

| | | |
|---|---|---|
| 2011/0216271 A1 | 9/2011 | Suzuki et al. |
| 2013/0032768 A1 | 2/2013 | Arbell et al. |
| 2014/0009902 A1 | 1/2014 | Banin et al. |
| 2017/0125648 A1 | 5/2017 | Cui et al. |

FOREIGN PATENT DOCUMENTS

| | | | |
|---|---|---|---|
| DE | 102015101216 A1 | 7/2016 | |
| WO | WO-2012059931 A1 * | 5/2012 | ....... G02F 1/133617 |

OTHER PUBLICATIONS

Luo, Z. et al., "Enhancing LCD Optical Efficiency with a Linearly Polarized Backlight and Polarization-Preserving Light Guide Plate," 57.2 SID 2014 Digest, 3 pages.
Roeb, M., "UV Spectroscopy," University of Cologne, Chair of Physical Chemistry, 1999, 71 pages.

* cited by examiner

OPTOELECTRONIC ARRANGEMENT HAVING A SEMICONDUCTOR CHIP AND A CONVERSION ELEMENT

This patent application is a national phase filing under section 371 of PCT/EP2015/069447, filed Aug. 25, 2015, which claims the priority of German patent application 10 2014 112 395.6, filed Aug. 28, 2014, each of which is incorporated herein by reference in its entirety.

TECHNICAL FIELD

An optoelectronic arrangement and a lighting device comprising an optoelectronic arrangement are provided.

BACKGROUND

Liquid Crystal Displays (LCDs) are often used particularly for displaying moving images. The latter can be backlit, for example, by light-emitting diodes as radiation sources. However, because of the polarizers used in LCDs to produce the images typically a comparatively large portion of radiation from the radiation sources is lost.

SUMMARY OF THE INVENTION

Embodiments of the invention provide an increase in efficiency of the backlighting of LCDs.

According to at least one embodiment of the optoelectronic arrangement, the arrangement comprises at least one semiconductor chip which is provided for generating radiation. In particular, the radiation is in the blue spectral range, the ultraviolet spectral range, or the red spectral range. The semiconductor chip is arranged, for example, in a housing or without a housing on a connection carrier, such as a circuit board.

According to at least one embodiment of the optoelectronic arrangement, the arrangement comprises a radiation conversion element. The radiation conversion element is arranged in particular downstream of the semiconductor chip in radiation direction. The radiation conversion element is in particular a prefabricated element of the optoelectronic arrangement. The radiation conversion element is, for example, a self-supporting element, such as a prefabricated film. The radiation conversion element is designed to convert primary radiation generated by the at least one semiconductor chip, for example, in the blue, ultraviolet or infrared spectral range, fully or at least partly into secondary radiation. The secondary radiation can be in the red, green, blue and/or infrared spectral range, for example. For example, the radiation can be converted from the blue or ultraviolet spectral range to the red or green spectral range or radiation can be converted from the visible to the infrared spectral range or from the infrared spectral range to the infrared spectral range. In particular, the secondary radiation can contain portions of radiation in at least two different spectral ranges of the visible spectrum, for example, in the red and green spectral range.

According to at least one embodiment of the optoelectronic arrangement, the radiation conversion element comprises a plurality of conversion bodies each with a longitudinal extension axis. The longitudinal extension axis runs in a direction in which the extension of the conversion bodies is the greatest.

According to at least one embodiment of the optoelectronic arrangement, the radiation conversion element comprises a plurality of quantum rods each with a longitudinal extension axis. The conversion bodies are thus formed at least partly by quantum rods. The longitudinal extension axis runs in the direction in which the extension of the quantum rods is the greatest. Quantum rods are defined in particular as volume bodies, which due to their small size experience at least a quantization of their energetic states transversal to the longitudinal extension axis. In particular, the quantum rods are not spherically symmetrical. For example, the quantum rods are rotationally symmetrical relative to the longitudinal extension axis.

The radiation conversion element may also comprise conversion bodies, for example, quantum rods or organic conversion bodies, which differ from one another in the peak wavelength of the secondary radiation. For example, first conversion bodies, for example, first quantum rods, emit in the red spectral range and second conversion bodies, for example, second quantum rods, emit in the green spectral range. In addition, third conversion bodies, for example, quantum rods, can be provided which emit, for example, in the blue spectral range. The peak wavelength of the radiation emitted by the quantum rods can be adjusted during the manufacture thereof in particular in terms of the material and/or the dimensioning of the quantum rods.

According to at least one embodiment of the optoelectronic arrangement, the spatial orientation of the longitudinal extension axes has a preferred direction. The conversion bodies, for example, the quantum rods, are thus not distributed randomly with respect to the orientation of their longitudinal extension axis. In particular, at least 50% of the conversion bodies, for example, the quantum rods, preferably at least 80% of the conversion bodies, for example, the quantum rods, are oriented so that the longitudinal extension axis of the conversion bodies, for example, the quantum rods, runs at an angle of at most 20° relative to the preferred direction. Ideally, all of the conversion bodies, for example, all of the quantum rods, are oriented along the preferred direction. However, an increased efficiency of the optoelectronic arrangement is achieved already if the conversion bodies, for example, the quantum rods, are only partly oriented along the preferred direction.

The preferred direction runs in particular in a main plane of extension of the radiation conversion element.

In at least one embodiment of the optoelectronic arrangement, the arrangement comprises a semiconductor chip which is provided for generating radiation. A radiation conversion element is arranged downstream of the semiconductor chip in radiation direction. The radiation conversion element comprises a plurality of conversion bodies, for example, quantum rods, each with a longitudinal extension axis, wherein a spatial orientation of the longitudinal extension axes has a preferred direction.

In contrast to spherical symmetric conversion bodies, for example, quantum dots, conversion bodies with a longitudinal extension axis, for example, quantum rods, do not emit isotropically in all dimensions. The conversion bodies, for example, the quantum rods, in each case emit most intensely in a plane perpendicular to the longitudinal extension axis. Along the longitudinal extension axis, the conversion bodies, for example, the quantum rods, emit no radiation. With a complete orientation of all longitudinal extension axes of all conversion bodies, for example, all quantum rods, parallel to the preferred direction, the radiation conversion element does not radiate any radiation parallel to the preferred direction. By orienting the preferred direction parallel to the main plane of extension, the portion of secondary radiation can be reduced which runs in the main plane of extension and would be difficult to use.

Furthermore, the orientation of the conversion bodies, for example, the quantum rods, in the radiation conversion element can cause that the optoelectronic arrangement radiates at least partly polarized radiation. The term 'partly polarized' in this context means that one polarization direction dominates over another polarization direction perpendicular to the latter. The polarized emission of nanomaterials is described, for example, on the website http://qlightnano.com/products/, the disclosure of which is incorporated into the present application. In this way, the portion of radiation that gets lost due to its polarization on a polarization filter on an inlet side of a downstream liquid crystal display can be reduced. In contrast to an optoelectronic arrangement which radiates un-polarized radiation, loss of half of the emitted radiation is prevented at this polarization filter. The portion of radiation used for backlighting a liquid crystal display is thus increased with the same power consumption of the optoelectronic arrangement. In other words, the polarization of the radiation necessary for the function of the liquid crystal display is not only achieved by the radiation input side polarization filter, which, with un-polarized radiation, inevitably results in the loss of half the radiation performance. Rather, the radiation in the optoelectronic arrangement is generated so that, due to the mechanism forming the basis of the radiation generation, the generated radiation mainly has, for example, by 55% or more or by 65% or more, suitable polarization.

Perpendicular to the longitudinal extension axis, the conversion bodies, for example, the quantum rods, have a maximum transverse extension, which is in particular smaller than a longitudinal extension in the longitudinal extension axis.

According to at least one embodiment of the optoelectronic arrangement, the conversion bodies, for example, the quantum rods, have a ratio of the longitudinal extension to the maximum transverse extension of between 2:1 inclusive and 20:1 inclusive. For example, the ratio is between 3:1 inclusive and 10:1 inclusive. Conversion bodies, for example, quantum rods with such a ratio have proved to be particularly suitable for a radiation conversion element for generating at least partly polarized radiation.

According to at least one embodiment of the optoelectronic arrangement, the conversion bodies, for example, the quantum rods, have a maximum transverse extension between 1 nm inclusive and 50 nm inclusive. For example, the maximum transverse extension is between 2 nm inclusive and 20 nm inclusive.

According to at least one embodiment of the optoelectronic arrangement, the quantum rods are based on an inorganic material. The quantum rods contain in particular an inorganic material, for example, an inorganic semiconductor material.

The inorganic quantum rods can contain, for example, a II-VI-compound semiconductor material, such as cadmium selenide, cadmium sulfide or zinc selenide. Alternatively or in addition, the quantum rods can contain a III-V-compound semiconductor material, such as indium phosphide. For generating radiation in the infrared spectral range, for example, $Al_xIn_yGa_{1-x-y}As$ with $0 \leq x \leq 1$ and $0 \leq x+y \leq 1$ or PbS is suitable.

According to at least one embodiment of the optoelectronic arrangement, the quantum rods each comprise a core and a shell which completely surrounds the core. The core and the shell are different from one another in particular with respect to their material. In particular, the core and the shell each comprise an inorganic compound semiconductor material. For example, the material of the shell has a greater band gap than the material of the core.

According to at least one embodiment of the optoelectronic arrangement, the conversion bodies are based on an organic material. The conversion bodies contain, for example, perylene, condensed aromatic compounds, ring systems or planar systems.

According to at least one embodiment of the optoelectronic arrangement, the quantum rods have an organic mantle. The mantle forms in particular the outer surface of the individual quantum rod. The organic mantle is in particular designed to prevent or at least reduce an agglomeration of quantum rods when forming the radiation conversion element. The aforementioned longitudinal and transverse extensions of the quantum rods relate to the extensions without the mantle. For example, the organic mantle surrounds the quantum rods in particular completely. The mantle comprises, for example, an organic material, based on phosphates, sulfides, amines or amides.

The organic mantle can be free from a radiation conversion effect. In this case the organic mantle does not contribute to the radiation conversion. Alternatively, the organic mantle can be involved in the radiation conversion. For example, the organic shell may contribute to the radiation absorption and emit energy to the quantum rods, such as by means of a Förster transfer.

According to at least one embodiment of the optoelectronic arrangement, the radiation conversion element comprises a matrix material, into which the conversion bodies, for example, the quantum rods, are embedded. The matrix material contains in particular a polymer material. For example, PET, PE, PS, PMMA, an acrylate, an epoxy, a silicone or a hybrid material with at least one epoxy or a silicone is suitable as the matrix material.

According to at least one embodiment of the optoelectronic arrangement, the radiation conversion element is surrounded completely by an encapsulation layer. The radiation conversion element is thus surrounded on all sides by the encapsulation layer. The encapsulation layer serves in particular for protecting the conversion bodies, for example, the quantum rods from oxygen and moisture. Also by using comparatively sensitive conversion bodies, for example, quantum rods, a long operating life of the arrangement can be achieved in a simplified manner. The matrix material per se of the radiation conversion element thus does not necessarily need to provide sufficient protection for the conversion bodies, for example, the quantum rods, from moisture and/or oxygen. The matrix material can however contribute to an increased encapsulation effect.

According to at least one embodiment of the optoelectronic arrangement, the encapsulation layer contains a layer stack with at least one layer of organic material and/or at least one layer of inorganic material.

According to at least one embodiment of the optoelectronic arrangement, the arrangement comprises a plurality of semiconductor chips provided for generating radiation. The semiconductor chips are arranged next to one another, for example, at least partly transversely, in particular perpendicular, to the preferred direction of the conversion bodies, for example, of the quantum rods. For example, a common radiation conversion element is assigned to at least two of the plurality of semiconductor chips. The manufacture of the arrangement is simplified in this way. Alternatively, an independent, separate radiation conversion element can be assigned to each semiconductor chip provided for generating radiation.

According to at least one embodiment of the optoelectronic arrangement, the radiation conversion element is arranged on a radiation exit surface of the semiconductor chip. For example, the radiation conversion element can be fixed by means of a securing layer onto the radiation exit surface.

According to at least one embodiment of the optoelectronic arrangement, the radiation conversion element is arranged spaced apart from the semiconductor chip (remote-phosphor configuration or also semi-remote-phosphor configuration). For example, the radiation conversion element is arranged on a housing for the semiconductor chip.

According to at least one embodiment, a lighting device comprises an optoelectronic arrangement and a radiation surface, wherein radiation generated during the operation of the optoelectronic arrangement exits through the radiation surface. The radiation exiting through the radiation surface is provided in particular for coupling into a liquid crystal display. The optoelectronic arrangement described above is particularly suitable for the lighting device.

According to at least one embodiment of the lighting device, the lighting device comprises a light guide. The light guide has a main surface through which the radiation coupled into the light guide exits. The main surface can form the radiation surface or run parallel to the radiation surface.

In particular, the radiation is coupled into a side surface of the light guide running obliquely or perpendicular to the main surface and passes through the main surface. The radiation from the optoelectronic arrangement coupled into the light guide is thus deflected in the light guide in the direction of the main surface.

According to at least one embodiment of the lighting device, the light guide is designed to be at least partly polarization-maintaining. The light deflection is performed in particular such that polarized radiation entering the light guide, for example, through the side surface is at least partly polarized on exiting through the main surface. Such polarization maintaining light guides are described in the article of Z. Luo et al. (Article 57.2 in SID 2014 Digest, p. 836-838), the disclosure of which is incorporated into the present application.

According to at least one embodiment of the lighting device, the radiation direction of the optoelectronic arrangement is perpendicular to the radiation surface. For the backlighting of liquid crystal displays such an arrangement is also referred to as direct backlighting.

According to at least one embodiment of the lighting device, an optical element is arranged downstream of the radiation conversion element of the optoelectronic arrangement in radiation direction, which optical element deflects the radiation emitted by the optoelectronic arrangement in the light guide at least partly in a polarization-maintaining manner. For example, the optical element comprises a plurality of prisms, which extend in a longitudinal direction, wherein the longitudinal direction runs parallel to the preferred direction of the conversion bodies, for example, the quantum rods. The prisms can collimate the radiation into a usable angular range. The optical element can be a film, for example, which is arranged on the optoelectronic arrangement. In particular, the film can be designed as a so-called brightness enhancement film (BEF).

According to at least one embodiment of the lighting device, the lighting device is provided for backlighting a liquid crystal display. The backlighting can thus be particularly energy-efficient and at the same time can have a long operating life.

BRIEF DESCRIPTION OF THE DRAWINGS

Further embodiments and developments are described by way of the exemplary embodiments described hereinafter in conjunction with the figures.

In the figures.

Identical, similar or similarly-acting elements are denoted by the same reference numerals in the Figures. The Figures and the size ratios of the elements shown in the Figures relative to one another are not to scale. Rather individual elements, in particular layer thicknesses, may have been exaggerated for illustrative purposes and/or to provide better understanding.

DETAILED DESCRIPTION OF ILLUSTRATIVE EMBODIMENTS

Figure 1:
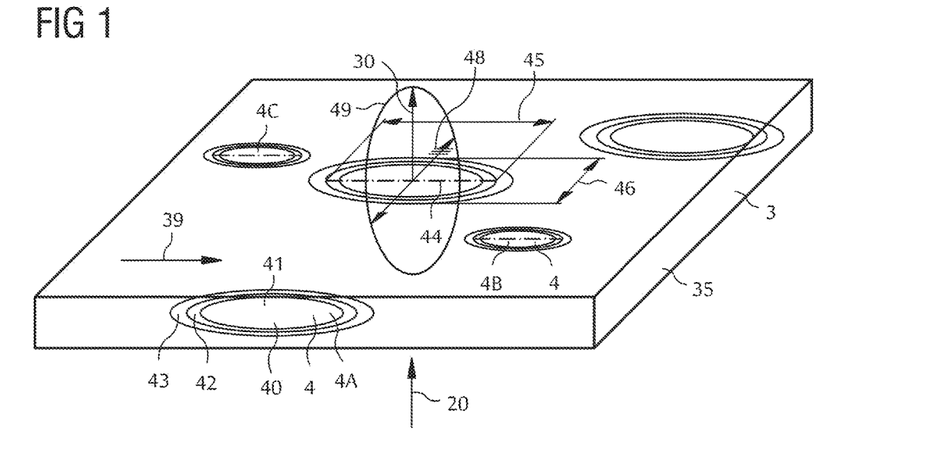
FIG. 1 shows an exemplary embodiment of a radiation conversion element in a perspective, schematic view.

FIG. 1 shows an exemplary embodiment of a radiation conversion element 3, in which the principle of functioning of the optoelectronic arrangement and the mechanism of radiation generation are explained.

The radiation conversion element 3 comprises a plurality of conversion bodies 40. In the following, by way of example, a configuration is described in which the conversion bodies 40 are quantum rods 4. Alternatively, the conversion bodies can also be based on an organic material and contain, for example, perylene, condensed aromatic compounds, ring systems or planar systems. The quantum rods 4 are embedded in a matrix material 35 of the radiation conversion element. The quantum rods 4 are each designed to be elongated and along a longitudinal extension axis 44 have a longitudinal extension 45 which is greater than a transverse extension 46 perpendicular to the longitudinal extension axis.

Upon the optical excitation of the quantum rods by primary radiation 20, the quantum rods emit a secondary radiation 30. The intensity of the radiation is proportional to $\sin^2\theta$, wherein $\theta$ indicates the angle between the longitudinal extension axis 44 and the radiation direction. The quantum rods thus do not emit radiation along their longitudinal extension axis 44. Perpendicular to the longitudinal extension axis 44, i.e., for $\theta=90°$ is a main radiation plane 49, which is shown in FIG. 1 schematically as a circle drawn in perspective. The radiation emitted by the quantum rods 4 is polarized respectively. A polarization direction 48 runs parallel to the longitudinal extension axis 44.

In the radiation conversion element 3 the individual quantum rods 4 are oriented so that the longitudinal extension axes 44 of the quantum rods 4 have a preferred direction 39. The preferred direction in particular runs in the main plane of extension of the radiation conversion element 3. In the shown exemplary embodiment, all of the longitudinal extension axes 44 run parallel to the preferred direction. In this ideal case, the secondary radiation generated by the quantum rods 4 in the radiation conversion element 3 is completely polarized. Individual quantum rods 4 can however also have an orientation of the longitudinal extension axis 44 deviating from the preferred direction 39 so that the secondary radiation 30 is partly polarized. The orientation of the quantum rods can be achieved during the manufacture in that the quantum rods are embedded into the matrix material in the form of a film and the film is anisotropically brought into an expanded state along one direction by the effect of heat. The orientation of the quantum rods is effected in this direction which is retained in the expanded state after the hardening of the matrix material. Alternatively or in addition to heat, the orientation can also be effected mechanically, for example, by traction or electromagnetically.

In the shown exemplary embodiment, the quantum rods 4 each comprise a core and a shell 42 which completely surrounds the core.

Furthermore, the quantum rods 4 comprise a mantle which is preferably made from an organic material. The mantle serves to avoid an agglomeration of individual quantum rods 4. The longitudinal extension 45 and the transverse extension 46 of the quantum rods 4 therefore relate to the respective extension of the quantum rods without the mantle 43.

The quantum rods 4 have a ratio of their longitudinal extension to their maximum transverse extension of between 2:1 inclusive and 20:1 inclusive, for example, between 3:1 inclusive and 10:1 inclusive. The maximum transverse extension is between 1 nm inclusive and 50 nm inclusive, for example, between 2 nm inclusive and 20 nm inclusive. The longitudinal extension is, for example, between 10 nm inclusive and 200 nm inclusive.

The radiation conversion element 3 comprises in the shown exemplary embodiment by way of example first quantum rods 4A, second quantum rods 4B and third quantum rods 4C. The first, second and third quantum rods are provided to generate secondary radiation portions having different peak wavelengths. For example, the first quantum rods generate radiation in the red spectral range, the second quantum rods generate radiation in the green spectral range and the third quantum rods generate radiation in the blue spectral range. In this case the radiation conversion element 3 can provide radiation portions in the red, green and blue spectral range, which are each polarized or are at least partly polarized. Furthermore, the quantum rods can each comprise spectrally narrow-band radiation so that losses at the color filters of the liquid crystal display can be minimized.

The first quantum rods 4A, the second quantum rods 4B and the third quantum rods 4C can differ from one another, for example, with regard to the extension and/or material used, in order to achieve peak wavelengths different from one another.

The radiation conversion element 3 can however also comprise only one type or two types of quantum rods 4 or more than three types of quantum rods.

The quantum rods 4 preferably contain an inorganic material, in particular a compound semiconductor material. In one arrangement with a core 41 and a shell 42, preferably both the core and the shell contain an inorganic material, in particular a compound semiconductor material. For example, the quantum rods 4 contain cadmium selenide, cadmium sulfide, zinc selenide or indium phosphide.

Figure 2A:
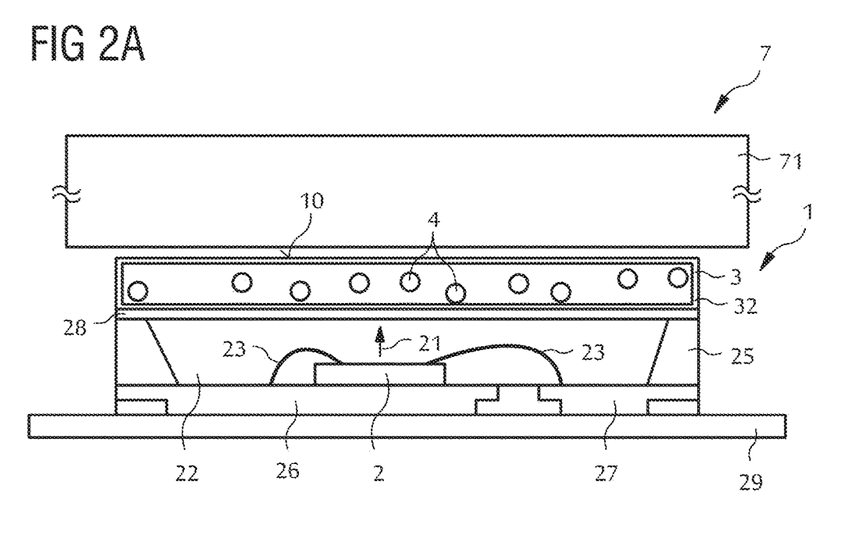
FIGS. 2A and 2B each show an exemplary embodiment of a lighting device with an optoelectronic arrangement in schematic sectional view.

An exemplary embodiment of a lighting device 7 with an optoelectronic arrangement 1 is shown in FIG. 2A in a schematic side view. The lighting device 7 comprises the optoelectronic arrangement 1 and a light guide 71.

The optoelectronic arrangement 1 comprises a semiconductor chip 2 provided for generating radiation. For example, the semiconductor chip includes an active range for generating radiation in the blue or ultraviolet spectral range on the basis of a nitride compound semiconductor material, such as $Al_xIn_yGa_{1-x-y}N$ with $0 \le x \le 1$, $0 \le y \le 1$ and $x+y \le 1$.

Furthermore, the optoelectronic arrangement comprises a radiation conversion element 3, which is arranged downstream of the semiconductor chip 2 in a radiation direction 21. The radiation conversion element 3 is thus part of the optoelectronic arrangement. Prior to the exit of the primary radiation generated during the operation of the optoelectronic arrangement in the semiconductor chip from a radiation exit surface 10 of the optoelectronic arrangement the radiation thus has to pass through the radiation conversion element 3. In the configuration shown in FIG. 2A, the radiation conversion element 3 forms the radiation exit surface.

The radiation conversion element 3 can be designed as described in connection with FIG. 1. The secondary radiation generated by the optoelectronic arrangement 1 in the radiation conversion element 3 and exiting through the radiation exit surface 10 of the optoelectronic arrangement is polarized or at least partly polarized. The preferred direction of the quantum rods is perpendicular to the section plane of FIG. 2A. The optoelectronic arrangement 1 also provides already polarized or at least partly polarized radiation so that during the backlighting of a liquid crystal display losses are reduced at the polarization filter, which is arranged on the radiation inlet side of the liquid crystal display. Furthermore, the secondary radiation determined by the production mechanism by means of oriented quantum rods is generated so that it is at least partly polarized already and the efficiency of the lighting is increased.

Furthermore, there is no radiation of the quantum rods 4 in the preferred direction, which is parallel to the main plane of extension of the radiation conversion element. This portion of radiation, which could only be coupled in with difficulty into the light guide 71, is thus reduced in favor of increased radiation perpendicular to the radiation exit surface.

Furthermore, the radiation conversion element 3 comprises an encapsulation layer 32. The encapsulation layer is provided in particular to protect the quantum rods 4 from moisture and/or oxygen. The encapsulation layer covers the radiation conversion element 3 on all sides. The encapsulation layer 32 contains or consists, for example, of a polymer material, such as silicone, epoxy, PET, parylene or polysilazane or is made from an inorganic material, such as silicon oxide, silicon nitride, aluminum oxide, titanium oxide or zirconium oxide. The encapsulation layer can in particular be designed to be multi-layered. Furthermore, the encapsulation layer can also have sequence of layers with at least one organic and one inorganic layer. The encapsulation layer 32 forms the radiation exit surface 10 of the optoelectronic arrangement in the exemplary embodiment shown in FIG. 2A.

The semiconductor chip 2 is arranged in a housing body 25. The housing body 25 molds around a first connecting guide 26 and an additional connecting guide 27. The first connecting guide and the additional connecting guide are accessible for the electrical contact of the semiconductor chip 2 from outside the housing body 25 on the side being remote from the radiation exit surface 10. The semiconductor chip 2 is connected via connecting lines 23 to the connecting guide 26 and the additional connecting guide 27. In the shown embodiment, the semiconductor chip 2 has two contacts on the side facing the radiation exit surface 10. Alternatively however, a semiconductor chip can also be used which comprises at least one contact or both contacts on the side facing away from the radiation exit surface 10.

The semiconductor chip 2 is embedded in a covering 22. The covering 22 contains advantageously a material which is transmissive to the primary radiation, for example, a silicone or an epoxy.

In the embodiment shown in FIG. 2A, the radiation conversion element 3 is spaced apart from the semiconductor chip 2. The radiation conversion element 3 is fastened to the housing body 25. For example, the radiation conversion element 3 is fastened by means of a securing layer 8. Alternatively, the radiation conversion element can be laminated onto the housing body.

On the side facing away from the radiation exit surface 10 the connecting guide 26 and the additional connecting guide 27 are connected in an electrically conducting manner to a connection carrier 29, for example, a circuit board.

The optoelectronic arrangement 1 can of course also comprise more than one semiconductor chip 2 provided for producing radiation, wherein the semiconductor chips can be arranged respectively in a housing or a plurality of semiconductor chips can be arranged in a housing. Furthermore, alternatively a plurality of semiconductor chips can also be arranged without a housing on the connection carrier 29 and electrically contacted. The type of housings for the semiconductor chips 2 can be selected within broad limits. For example, the housing body 25 can also be made from a material which is molded onto the semiconductor chip 2.

Figure 2B:
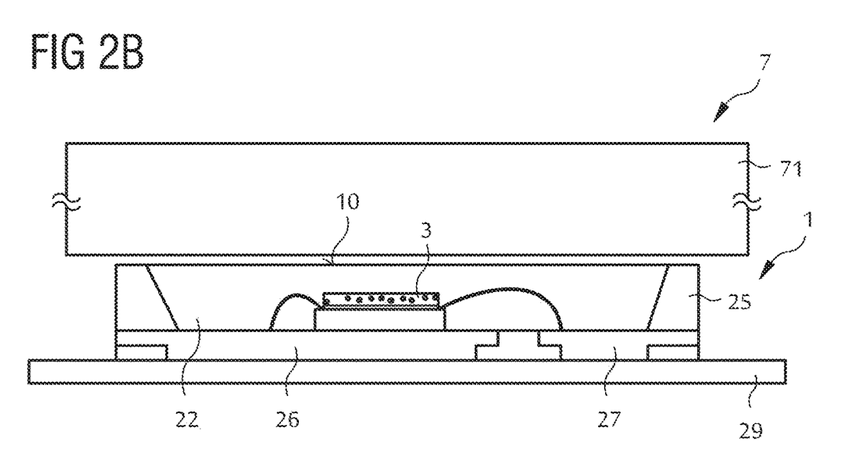

In the embodiment shown in FIG. 2B, the radiation conversion element 3, unlike the one shown in the exemplary embodiment in FIG. 2A, is arranged directly on the semiconductor chip 2. The radiation conversion element 3 is embedded together with the semiconductor chip 2 in the covering 22. The covering can also be used for protecting the radiation conversion element. In this case, it is possible to avoid having an additional encapsulation layer. The covering runs partly between the radiation conversion element and the radiation exit surface 10 of the optoelectronic arrangement.

Figure 3A:
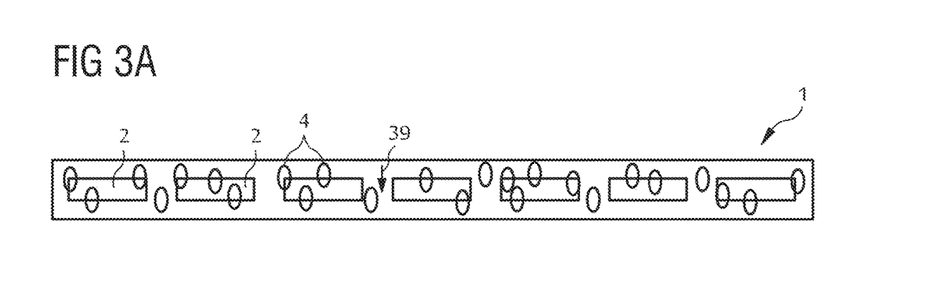
FIGS. 3A and 3B show a further exemplary embodiment of an optoelectronic arrangement in schematic plan view (FIG. 3A) and associated side view (FIG. 3B)
Figure 3B:
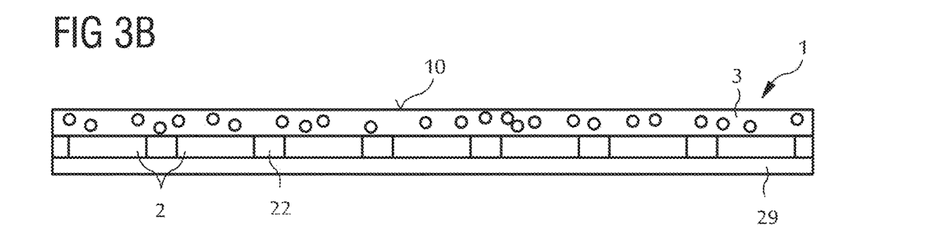

FIGS. 3A and 3B show a further exemplary embodiment of an optoelectronic arrangement 1.

The optoelectronic arrangement comprises a plurality of semiconductor chips 2. The semiconductor chips 2 are arranged without a housing on the connection carrier 29. The radiation conversion element 3 forms a common radiation conversion element for a plurality of semiconductor chips 2, in particular all of the semiconductor chips of the optoelectronic arrangement 1. The radiation conversion element also covers at least partly the covering 22 arranged between the semiconductor chips. In the shown embodiment, the semiconductor chips 2 are arranged in a direction perpendicular to the preferred direction 39 in the form of a strip. Such a configuration of the optoelectronic arrangement 1 is particularly suitable for coupling in laterally into a light guide (See, e.g., FIG. 4A).

On the side facing the radiation exit surface 10 the semiconductor chips 2 are free of the covering 22. For the covering therefore also a reflective material can be used, for example, a polymer material filled with white pigments, such as a silicone or an epoxy or a hybrid material with a silicone and an epoxy. For example, titanium oxide or zirconium oxide are suitable white pigments.

Alternatively, the covering 22 can also be designed to be transmissive to radiation. In this case the connection carrier 29 is preferably designed to be reflective, for example, by means of a coating, which is designed to be reflective for the radiation emitted by the optoelectronic arrangement 1, for example, having a reflectivity of at least 60%. Preferably, the coating is metallic. A polarization-maintaining reflection can thus be easily achieved.

Figure 4A:
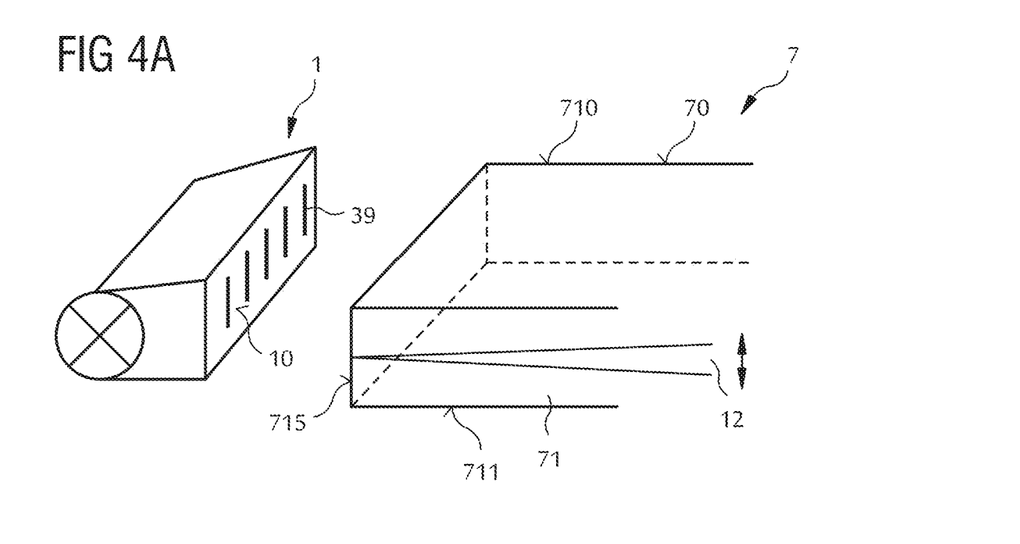
FIGS. 4A and 4B each show a further exemplary embodiment of a lighting device with an optoelectronic arrangement in schematic view.

FIG. 4A shows an embodiment of a lighting device 7, wherein the optoelectronic arrangement 1 can in particular be designed as described in connection with FIGS. 3A and 3B.

The radiation produced during the operation of the optoelectronic arrangement 1 is coupled in by means of a side surface 715 of the light guide 71 of the lighting device. The radiation of the light guide 71 is performed via a main surface 710, which runs along a main plane of extension of the light guide 71. The light guide 71 forms a radiation surface 70 of the lighting device. The preferred direction 39 of the quantum rods 4 is perpendicular to the main surface 710, so that the radiation of the optoelectronic arrangement as described in connection with FIG. 1 is mainly in a narrow-angled radiation pattern 12 parallel to the main plane of extension of the light guide 71. In this way, a particularly efficient coupling in the light guide may be achieved. At the same time the preferred direction in the optoelectronic arrangement as described in connection with FIG. 1 creates a broad-angled radiation in the main plane of extension of the light guide. This results in an efficient mixture of light inside the light guide and thus in a homogenous radiation over the radiation surface 70. In this way, particularly small dead areas at the edge of the lighting device may be obtained.

The light guide 71 is further preferably designed to be polarization-maintaining, so that the radiation of the lighting device leaving the main surface 710 is at least partly polarized. For this the light guide 71 can have a structure, for example, an additional main surface 711 opposite the main surface, on which the polarization-maintaining deflection takes place (not shown specifically). Alternatively, the light guide can be wedge-shaped, for example. The greater the degree of polarization of the radiation exiting the lighting device, the smaller the losses at a polarization filter of a liquid crystal display arranged downstream.

Furthermore, in the radiation conversion element 3, there is no radiation in the preferred direction 39. This portion of radiation which would not be supplied to the light guide 71, is thus minimized and the efficiency of the backlighting of a liquid crystal display increased.

Figure 4B:
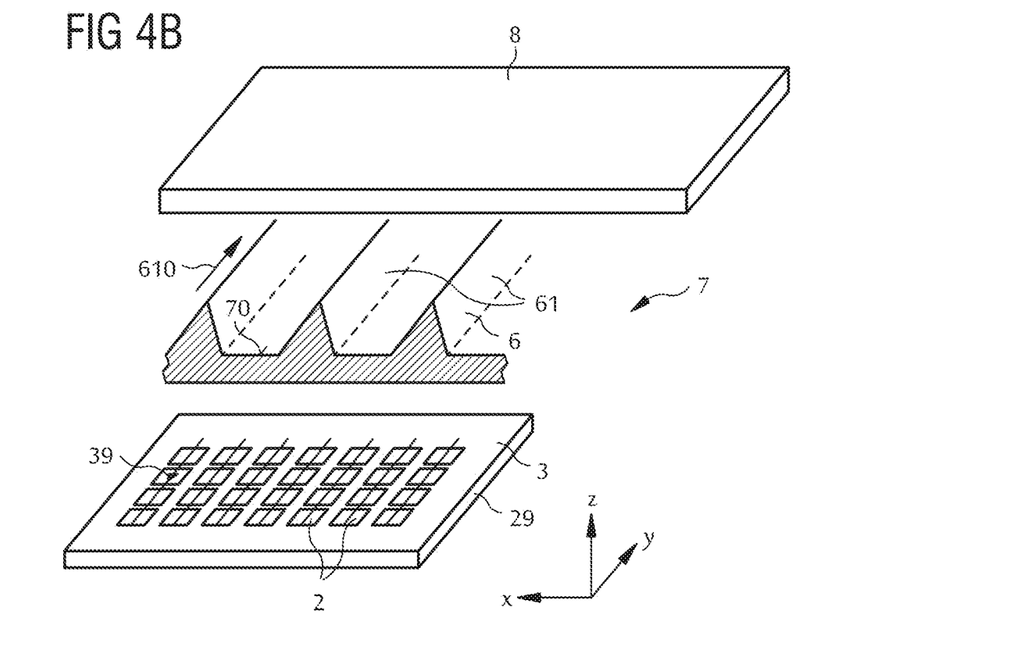

FIG. 4B shows in a schematic perspective representation a lighting device 7, in which the optoelectronic arrangement 1 is used for the direct backlighting a liquid crystal display 8. For this the optoelectronic arrangement 1 comprises a plurality of semiconductor chips 2, which are arranged in the form of a matrix on a connection carrier 29. Of course, also another planar arrangement can be used, for example, in the form of a hexagonal pattern. The main plane of extension of the connection carrier (x-y-plane in FIG. 4B) is parallel to the main plane of extension of the liquid crystal display 8. The radiation directions of the optoelectronic arrangements are respectively perpendicular to the radiation surface 70.

An optical element 6 is assigned to the optoelectronic arrangement 1. The optical element 6 is shown for more clarity in the form of a detail which is exaggerated in size. The optical element 6 is designed to deflect the radiation from the radiation conversion element 3, which is polarized in the preferred direction 39, to be polarization-maintaining. For this the optical element comprises by way of example a plurality of elongated prisms 61, the longitudinal direction 610 of which is parallel to the preferred direction 39. The optical element 6 can be designed, for example, as a film, which is arranged in the beam path between the semiconductor chips 2 and the liquid crystal display 8.

The radiation of the quantum rods 4 is performed as described in connection with FIG. 1 with a comparatively narrow angle about the x-axis in FIG. 4B. The semiconductor chips 2 are therefore arranged in the optoelectronic arrangement 1 in the preferred direction 39 (y-direction) preferably at a shorter distance than in direction (x-direction) perpendicular to the preferred direction 39 and in the main plane of extension of the radiation conversion element 3.

By means of the described optoelectronic arrangement 1 in a particularly efficient manner, it is possible to achieve an even backlighting of a liquid crystal display both with a lateral coupling in a light guide and with direct backlighting. In particular, portions of radiation, which cannot be used for the backlighting, for example, because of an unsuitable radiation direction or unsuitable polarization, can be reduced during the production of radiation in favor of an increase in the usable radiation.

The invention is not limited to the exemplary embodiments described in the description. Rather the invention includes every new feature and every combination of features which in particular includes every combination of features in the claims, even if this feature or this combination has not been specifically described in the claims or exemplary embodiments.

The invention claimed is:

1. An optoelectronic arrangement comprising:
   a semiconductor chip configured to generate radiation; and
   a radiation conversion element located downstream of the semiconductor chip with respect to a radiation direction,
   wherein the radiation conversion element comprises a plurality of conversion bodies each with a longitudinal extension axis,
   wherein a spatial orientation of the longitudinal extension axes has a preferred direction,
   wherein the radiation conversion element is completely surrounded by an encapsulation layer, and
   wherein the radiation conversion element comprises a matrix material in which the conversion bodies are embedded.

2. The optoelectronic arrangement according to claim 1, wherein the conversion bodies have a maximum transverse extension perpendicular to the longitudinal extension axis, and wherein a ratio of a longitudinal extension along the longitudinal extension axis to the maximum transverse extension is between 2:1 inclusive and 20:1 inclusive.

3. The optoelectronic arrangement according to claim 2, wherein the conversion bodies have a maximum transverse extension of between 1 nm inclusive and 50 nm inclusive.

4. The optoelectronic arrangement according to claim 1, wherein the conversion bodies comprise quantum rods.

5. The optoelectronic arrangement according to claim 4, wherein each quantum rod has a core and a shell that completely surrounds the core.

6. The optoelectronic arrangement according to claim 4, wherein each quantum rod comprises an organic mantle.

7. The optoelectronic arrangement according to claim 1, wherein the conversion bodies are based on an inorganic material.

8. The optoelectronic arrangement according to claim 1, wherein the conversion bodies are based on an organic material.

9. The optoelectronic arrangement according to claim 1, wherein the encapsulation layer contains a layer stack with at least one layer of organic material and/or at least one layer of inorganic material.

10. The optoelectronic arrangement according to claim 1, wherein the optoelectronic arrangement comprises a plurality of semiconductor chips configured to generate the radiation, and wherein the semiconductor chips are arranged next to one another transversely to the preferred direction of the conversion bodies.

11. A lighting device comprising:
    an optoelectronic arrangement according to claim 1; and
    a radiation surface through which the radiation generated during an operation of the optoelectronic arrangement exits.

12. The lighting device according to claim 11, further comprising a light guide with a main surface and a side surface that is oblique or perpendicular to the main surface, wherein the radiation is coupled in through the side surface of the light guide and exits through the main surface.

13. The lighting device according to claim 12, wherein the light guide is designed to be at least partly polarization-maintaining.

14. The lighting device according to claim 11, wherein the radiation direction of the optoelectronic arrangement is perpendicular to the radiation surface.

15. The lighting device according to claim 14, further comprising an optical element with a plurality of prisms arranged downstream of the radiation conversion element in the radiation direction, wherein the prisms extend in a longitudinal direction, and wherein the longitudinal direction is parallel to the preferred direction of the conversion bodies.

16. The lighting device according to claim 11, wherein the lighting device is configured to back-light a liquid crystal display.

17. An optoelectronic arrangement comprising:
    a semiconductor chip configured to generate radiation; and
    a radiation conversion element located downstream of the semiconductor chip with respect to a radiation direction,
    wherein the radiation conversion element comprises a plurality of conversion bodies each having a longitudinal extension axis,
    wherein a spatial orientation of the longitudinal extension axes has a preferred direction, and
    wherein
        the semiconductor chip is arranged in a housing and the radiation conversion element is fixed to the housing.

18. The optoelectronic arrangement according to claim 17, wherein the conversion bodies have a maximum transverse extension perpendicular to the longitudinal extension axis, and wherein a ratio of a longitudinal extension along the longitudinal extension axis to the maximum transverse extension is between 2:1 inclusive and 20:1 inclusive.

19. The optoelectronic arrangement according to claim 17, wherein the conversion bodies comprise quantum rods.

20. The optoelectronic arrangement according to claim 17, wherein the conversion bodies are based on an inorganic material.

* * * * *